United States Patent
Gauvin et al.

(10) Patent No.: US 8,104,077 B1
(45) Date of Patent: Jan. 24, 2012

(54) SYSTEM AND METHOD FOR ADAPTIVE END-POINT COMPLIANCE

(75) Inventors: William Gauvin, Leominster, MA (US); Ed Taranto, Boston, MA (US); Steve Zhou, Bedford, MA (US)

(73) Assignee: Symantec Corporation, Mountain View, CA (US)

( * ) Notice: Subject to any disclaimer, the term of this patent is extended or adjusted under 35 U.S.C. 154(b) by 928 days.

(21) Appl. No.: 11/324,446

(22) Filed: Jan. 3, 2006

(51) Int. Cl.
*H04L 29/06* (2006.01)
*G06F 21/00* (2006.01)

(52) U.S. Cl. ............................... 726/12; 726/23
(58) Field of Classification Search ............ 726/12, 726/13, 24
See application file for complete search history.

(56) References Cited

U.S. PATENT DOCUMENTS

| | | | |
|---|---|---|---|
| 6,003,084 A * | 12/1999 | Green et al. | 709/227 |
| 7,302,480 B2 * | 11/2007 | Lahtinen | 709/224 |
| 2003/0009690 A1 * | 1/2003 | Grupe | 713/201 |
| 2004/0167984 A1 * | 8/2004 | Herrmann | 709/229 |
| 2005/0144481 A1 * | 6/2005 | Hopen et al. | 713/201 |
| 2006/0250968 A1 * | 11/2006 | Hudis et al. | 370/241 |

\* cited by examiner

*Primary Examiner* — Gilberto Barron, Jr.
*Assistant Examiner* — Shaun Gregory
(74) *Attorney, Agent, or Firm* — Gunnison, McKay & Hodgson, L.L.P.

(57) ABSTRACT

A security gateway is provided to facilitate end-point compliance of connected clients to insure appropriate security levels are maintained. The gateway operates as a policy enforcement point, and, when necessary, is used to apply and/or provide the required level of compliance for a connection on behalf of a requesting client. In one aspect, a specified level of compliance for a given security feature is facilitated, even if the requesting client is not able to meet that level of compliance at the time of the request. An adaptive end-point compliance model measures the requesting client's current level of compliance for one or more software programs on the client and may either require remediation, for example, when knowing that the remediation server is available and responding, or may provide, via a surrogate connection, the necessary level of compliance when remediation is not possible.

11 Claims, 6 Drawing Sheets

SYSTEM AND METHOD FOR ADAPTIVE END-POINT COMPLIANCE

FIELD OF THE INVENTION

The present invention is directed to end-point compliance in a network where connections between nodes on the network are dependent upon a level of security compliance of a requesting node. When a requesting node is not compliant, the connection request is either denied or a compliant connection is provided.

BACKGROUND OF THE INVENTION

With the proliferation of computer software viruses, including spyware and other malicious types of code, many users are implementing defenses such as anti-virus software, as is available from Symantec Corporation of Cupertino, Calif. This anti-virus software, however, requires the vigilance of the user in maintaining the virus-detection signatures for the anti-virus software. The anti-virus software may not recognize new viruses if the virus signatures are not updated. As is known, the updates to the virus signatures are available from a central server usually provided by the anti-virus software vendor.

In addition to keeping the anti-virus signatures up to date, maintaining the patch level of the operating system (OS) of the computer, for example, Microsoft Windows available from Microsoft Corporation of Redmond, Wash. is also an important part of maintaining a system to be as secure as is possible. Operating system patches and updates are made available on a regular basis, also from the vendor of the OS, and their installation on a given system better insures that as much protection as is possible against malicious software is being implemented.

Thus, while the tools may be available to an end user for implementation against malicious code, the installation of these updates still requires either user intervention or automatic download during "off hours" using a scheduled maintenance process to assure that the system is up-to-date for its software protection. In addition, accessibility to the update servers that provide, for example, the virus signatures or OS updates, is necessary to remain compliant. If access is prevented or servers are temporarily unavailable for any reason, security is potentially compromised.

SUMMARY OF THE INVENTION

In one embodiment of the present invention, a security gateway is provided to facilitate end-point compliance, i.e., it is being used as a policy enforcement point, and, when necessary, it is used to apply and/or provide the required level of security compliance for a connection on behalf of a requesting client. Thus, one embodiment of the present invention provides for insuring that a specified level of compliance for a given security feature is facilitated, even if the requesting client is not able to meet that level of compliance at the time of the request. An adaptive end-point compliance model measures the requesting client's current level of compliance for one or more software programs and/or security features on the client and the security gateway may either require remediation, for example, when knowing that the remediation server is available and responding, or may provide a surrogate connection, with the necessary level of compliance, on behalf of the client when the remediation is not possible or practical.

In one embodiment, a method of controlling access in a network comprises: receiving, from a client, a request for access to a resource on the network; determining a level of compliance of the client; comparing the client compliance level to a predetermined policy to determine if the client is allowed access to the resource; if it is determined that the client compliance level does not allow access to the resource, then determining from the policy if a surrogate connection to the resource is authorized to be established on behalf of the client; and if authorized by the policy, establishing a surrogate connection to the resource on behalf of the client.

In an alternate embodiment, comparing the client compliance level to a predetermined policy comprises: comparing the client compliance level to a predetermined compliance threshold level, wherein access is denied if the client compliance level is less than the predetermined compliance threshold level.

Further, establishing the surrogate connection on behalf of the client comprises: establishing a first channel from the requesting client to an intermediate node and a second channel from the intermediate node to the resource, wherein the intermediate node receives client communications on the first channel from the client destined for the resource and receives resource communications on the second channel from the resource destined for the client; and the intermediate node processing the resource communications prior to forwarding to the requesting client and processing the received client communications prior to forwarding to the resource, wherein the intermediate node has a compliance level equal to or greater than the predetermined compliance threshold level.

The processing of the resource communications and the client communications provides the compliant connection between the client and the resource.

At least one of processing the resource communications and the client communications comprises scanning for malicious software code.

In another embodiment, the policy is rules-based and at least one of the rules defines a first time period during which a surrogate connection will not be established on behalf of the client. Further, the policy is rules-based and at least one of the rules determines access as a function of client information, resource information and a date and time stamp of the access request.

Determining whether or not there is authorization to establish a surrogate channel on behalf of the requesting client is a function of one or more of: an identity of the requesting client; an identity of the network resource; a date and time of receipt of the request; and the client compliance level.

In another embodiment, a computer program product for controlling access in a network comprises a computer usable medium having computer readable program code thereon, including: program code for receiving, from a client, a request for access to a resource on the network; program code for determining a level of compliance of the client; program code for comparing the client compliance level to a predetermined policy to determine if the client is allowed access to the resource; program code for determining, from the policy, if a surrogate connection to the resource is authorized to be established on behalf of the client; and program code for establishing, if authorized by the policy, a surrogate connection to the resource on behalf of the client.

In yet another embodiment, a system for controlling access in a network comprises: means for receiving, from a client, a request for access to a resource on the network; means for determining a level of compliance of the client; means for comparing the client compliance level to a predetermined policy to determine if the client is allowed access to the resource; means for determining from the policy if a surrogate connection to the resource is authorized to be established on behalf of the client, if it is determined that the client compliance level does not allow access to the resource; and means for establishing a surrogate connection to the resource on behalf of the client if authorized by the policy.

BRIEF DESCRIPTION OF THE DRAWINGS

The above and further advantages of the invention may be better understood by referring to the following description in conjunction with the accompanying drawings in which.

DETAILED DESCRIPTION

Figure 1:
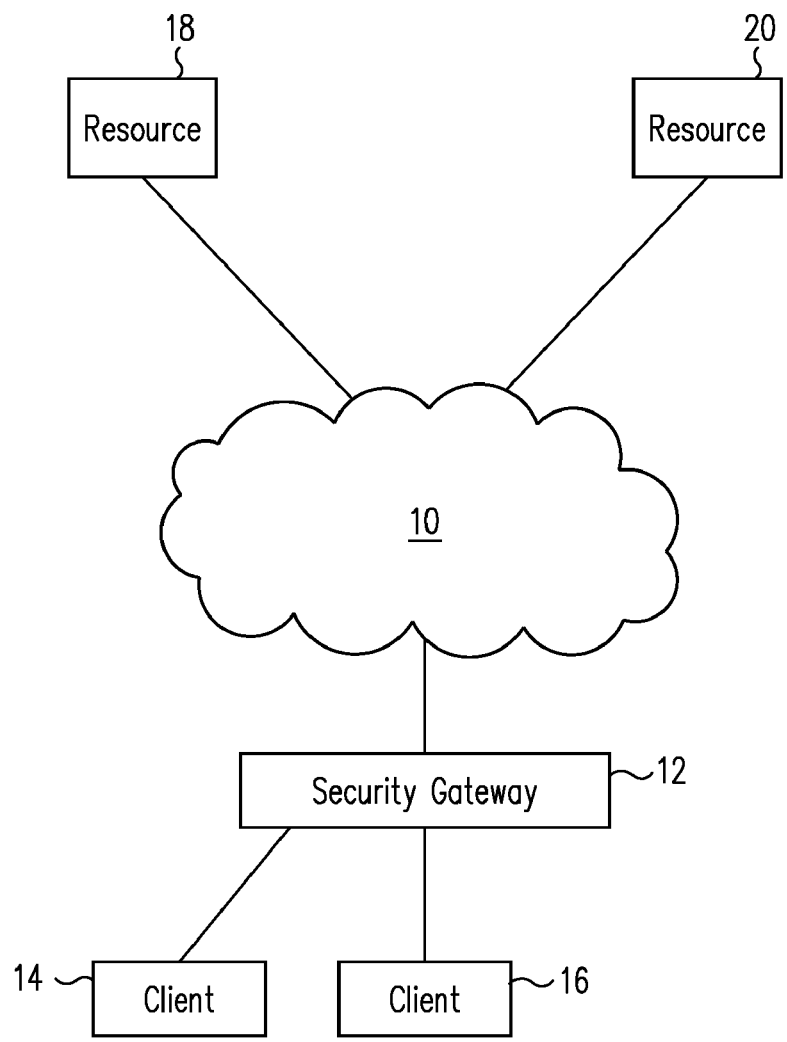
FIG. 1 is a system according to one embodiment of the present invention.

The invention is herein described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, which are, for brevity, described in the context of a single embodiment, may also be provided separately or in any suitable subcombination.

End-point compliance requires that, prior to a client system connecting to another system, for example, a server, a database file or other type of resource, that the client be up to date with respect to its security software levels. These software requirements, for example, make sure that the anti-virus software is up to date with its virus definitions, the operating system has all of its current software and security patches or, if necessary, that a particular piece of software is operative.

In an end-point compliance solution, when a client has requested a connection, a determination is made as to the revision levels of the client's software. If one or more of the software programs is out of revision, the client is instructed to obtain the appropriate update and/or patches, and then to request a connection again.

Requiring compliance of a client prior to allowing the client's request for connection, however, may be problematic in a situation where the remediation, i.e., the updating of a software component on the client is not possible or desirable. This may be the situation where the client is unable to reach the update/patch management system because the latter is unavailable, thus delaying the client's connection. In a high availability environment, where the client has to maintain its availability during particular hours of operation, a remediation where the client must either reboot or restart services that must not be stopped because of high demand or service obligations after updating its security features, would also not be feasible nor desirable as it would severely impact its availability.

An end-point compliance solution that always requires full remediation of the client before allowing a connection, therefore, presents a very limiting solution in the environments described above because of the impact on system performance and availability.

In one embodiment of the present invention, a security gateway is provided to facilitate end-point compliance, i.e., being used as a policy enforcement point, and, when necessary, it is used to apply and/or provide the required level of compliance for a connection on behalf of a requesting client. Thus, one embodiment of the present invention provides for insuring that a specified level of compliance for a given security feature is facilitated, even if the requesting client is not able to meet that level of compliance at the time of the request. An adaptive end-point compliance model measures the requesting client's current level of compliance for one or more software programs on the client and the security gateway may either require remediation, for example, when knowing that the remediation server is available and responding, or may provide a connection with the necessary level of compliance when the remediation is not possible or practical.

In accordance with another embodiment of the present invention, as will be discussed in more detail below, an architecture is provided that has the capabilities to determine the level of compliance of end-point computers, i.e., requesting clients, that are both mobile and/or stationary. The level of compliance is based on, but not limited to, the revision levels of the entities that provide operating system and/or security features in a requesting client. The access rights for a given computer or node on the network will be assigned based on the current level of compliance. The security checks, and the compliance checks, may be dynamically adjusted based on the capability of the end-point with respect to a firewall rule set, anti-virus rule set, and intrusion detection software protection, so that the security gateway may be possibly off-loaded of these tasks. This coordination between the security gateway and the end user may be modeled on the Trusted Network Connect (TNC) architecture as defined by the Trusted Computer Group (TCG), www.trustedcomputing-group.org, that specifies a design for providing a gateway service to control a network based on client compliance.

A client that does not meet specific compliance levels may be dynamically updated to do so prior to being allowed access to the network or a resource on the network.

In another embodiment of the present invention, the level of security protection, and detection and access allowed to a client based on threat analysis and level of compliance, is adjusted depending on the current situation. Thus, as the level of threats increases, the security gateway calculates a level of security compliance required on the requesting clients, turns on additional security checks and updates security definitions that may be required so as to restrict access requests that are suspect. The adjustment of the threat level is also, in one embodiment, based on the type of activity on a client. As an example, a client that only performs internal operations, relative to the network, may have a lower infection risk than a client that connects to external resources and, therefore, might not need as much protection. Once a client attempts to access a more insecure resource, its security requirement changes to an increased level of security compliance.

In accordance with one embodiment of the present invention, as shown in FIG. 1, a network 10 is provided. The network 10 may be made of any one or more known network topologies and/or connection protocols, for example, the Internet, a LAN, or WAN, and may be either wired or wireless connections and/or a combination thereof. A security gateway 12 is connected to the network 10 and complies with one or more of the necessary protocols to maintain the connection to the network 10 and may operate in a mode similar to that of a bridge or a router. A first client 14 and a second client 16 are each coupled to the security gateway 12. Access by the first and second clients 14, 16 to the network 10 and any other node coupled to the network 10 is obtained through the security gateway 12. A first resource 18 and a second resource 20 are also coupled to the network 10 and may be, for purposes of explaining the present invention, considered to be targets of connection requests made by either of the first and second clients 14, 16. The first and second resources 18, 20 may be, but are not limited to, other clients, a server, a database, or any other entity to which a connection would be made. Where the first and second clients 14, 16 are the originators of a request, all such requests for connection to other nodes on the network 10 are obtained only through the security gateway 12. Thus, the security gateway 12 functions as the provider of end-point compliance and will only facilitate the connection if the requesting client is compliant at the time of the request.

The security gateway 12, as will be described in more detail below, may contain one or more policies for evaluating a connection request. A policy will determine whether or not a requesting client will be allowed to make its connection depending upon what policies apply to the requesting client's request and the parameters of these policies.

Figure 2:
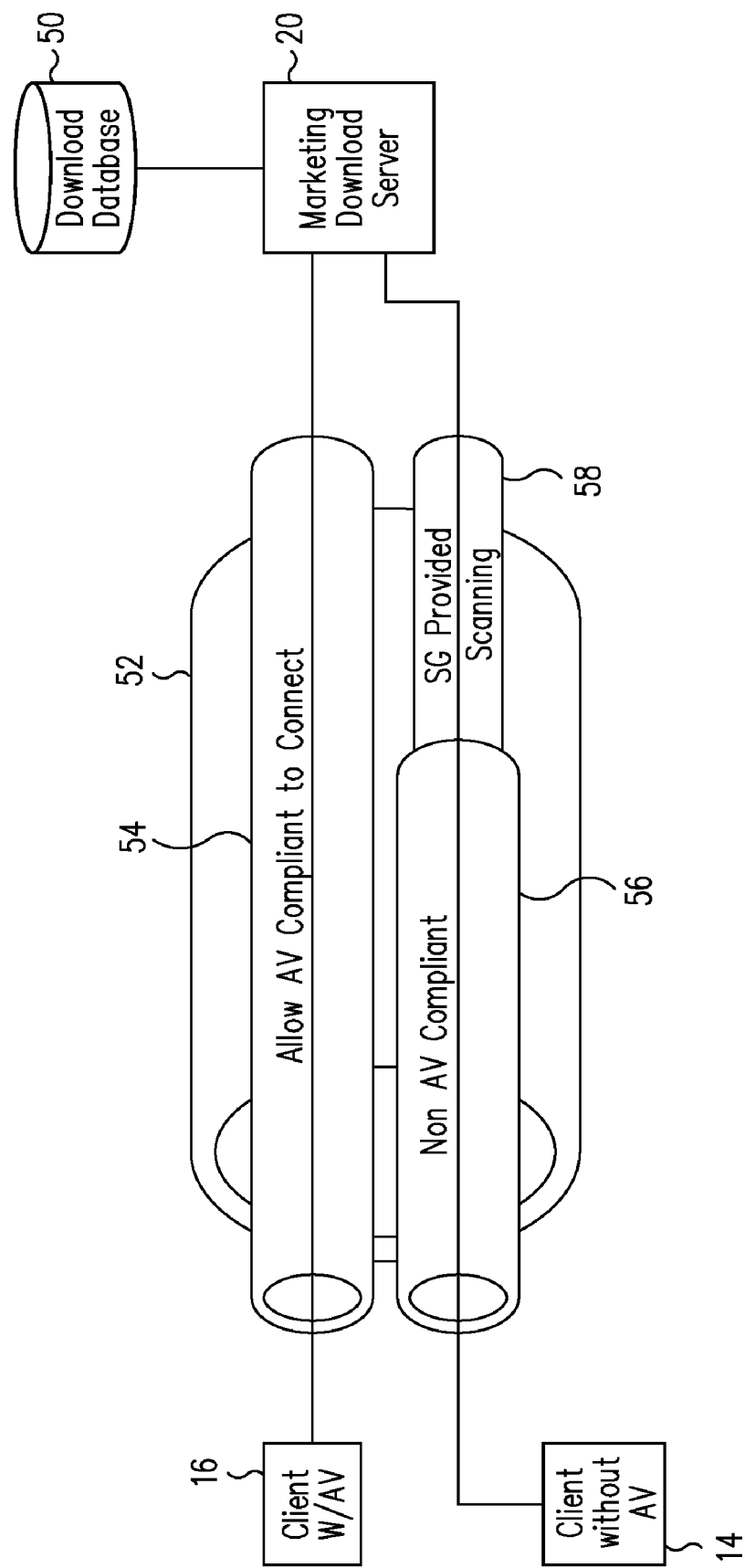
FIG. 2 is a representation of a policy application in accordance with one embodiment of the present invention.

A representative policy will be discussed with respect to the diagram shown in FIG. 2. As shown in FIG. 2, first and second clients 14, 16 are connecting through to the second resource 20 that is functioning as a marketing download server. Materials that are downloaded by the marketing download server 20 are provided from a database 50. An overall policy 52 is implemented by the security gateway 12 as to each of the requested connections made by the first and second clients 14, 16.

In the example of FIG. 2, the applicable policy 52 requires that a requesting entity be fully anti-virus software compliant in order to connect with the server 20. Assuming, for explanatory purposes, that the second client 16 is determined to be fully compliant with respect to its anti-virus software, the policy 52 will allow a connection 54 between the second client 16 and the server 20.

Assume, again for purposes of explanation only, that the first client 14 is not compliant with its anti-virus software and cannot obtain the required update, and therefore, is considered to have no anti-virus support. The security gateway 12 will adapt a data stream 56 from the first client 14 to the server 20 by providing anti-virus scanning 58 on behalf of the first client 14. Thus, the security gateway 12 will, in this example, operate as a bridge to connect the client 14 to the server 20 and provide the anti-virus scanning to the data stream as it passes through.

The foregoing example with respect to FIG. 2, uses anti-virus software as the security feature requiring compliance, however, any feature or features may be measured can be used to determine client compliance. These features include, but are not limited to, virtual private network services, firewall functions, dynamic data review features, content filters, anti-spam technology, anti-spim technology, IPSec tunneling services, intrusion detection services and operating system patches. Compliance may be a function of more than one parameter, for example, a compliance policy may be set that requires that the virus definitions be up to date and the OS patch level be at some acceptable minimum level before a connection is allowed.

An enforcement point policy within the security gateway 12 is based on the "who" and "what" identified in a connection request. Thus, individual nodes and resources may be identified. The items identified as the "who" may be grouped or classified to require specific levels of compliance. These levels may range from requiring full compliance to a level of noncompliance which can be adapted or compensated for by the security gateway 12.

The "who" and "what" could be, for example, the requesting client and the destination server, respectively. Levels of antivirus definitions and OS patches are other aspects of the connection as well as a timestamp of a request for connection. The foregoing may be used as a tuple and submitted as input to a policy engine for determination of compliance and connectivity authorization.

When an end-point is classified for compliance, it may be identified in at least the following ways: 1) as always requiring compliance of a specific feature; 2) as always requiring full compliance of all features; 3) as requiring high availability in that the system cannot lose connectivity; 4) as time critical in that only remediation is required during non-business hours, for example; and 5) as never requiring compliance of a specific feature.

The resources identified may be either network end-points or directories of specific resources such as files or databases. The policies may identify individual resources and specific compliances required for these resources. Thus, for example, if the target of a policy is a file resource, the policy may require full anti-virus compliance, adaptive or otherwise. If the policy is a database, the policy may require intrusion detection software or another security implementation targeted to the vulnerabilities associated specifically with that resource.

When a requesting client, however, is determined to be non-compliant for any reason and where the security gateway 12 will not provide compliance on behalf of the non-compliant client, that client is quarantined from connecting to the network. Quarantining of a non-compliant client is conceptual in that the client will remain physically connected to the network at some level, however, its access to resources is limited until the client can prove compliance to the security gateway 12. Once a client shows that it is compliant for the requested connection then, assuming that the client's current level of compliance is sufficient, the requested connection will then be authorized by the security gateway 12.

Figure 3A:
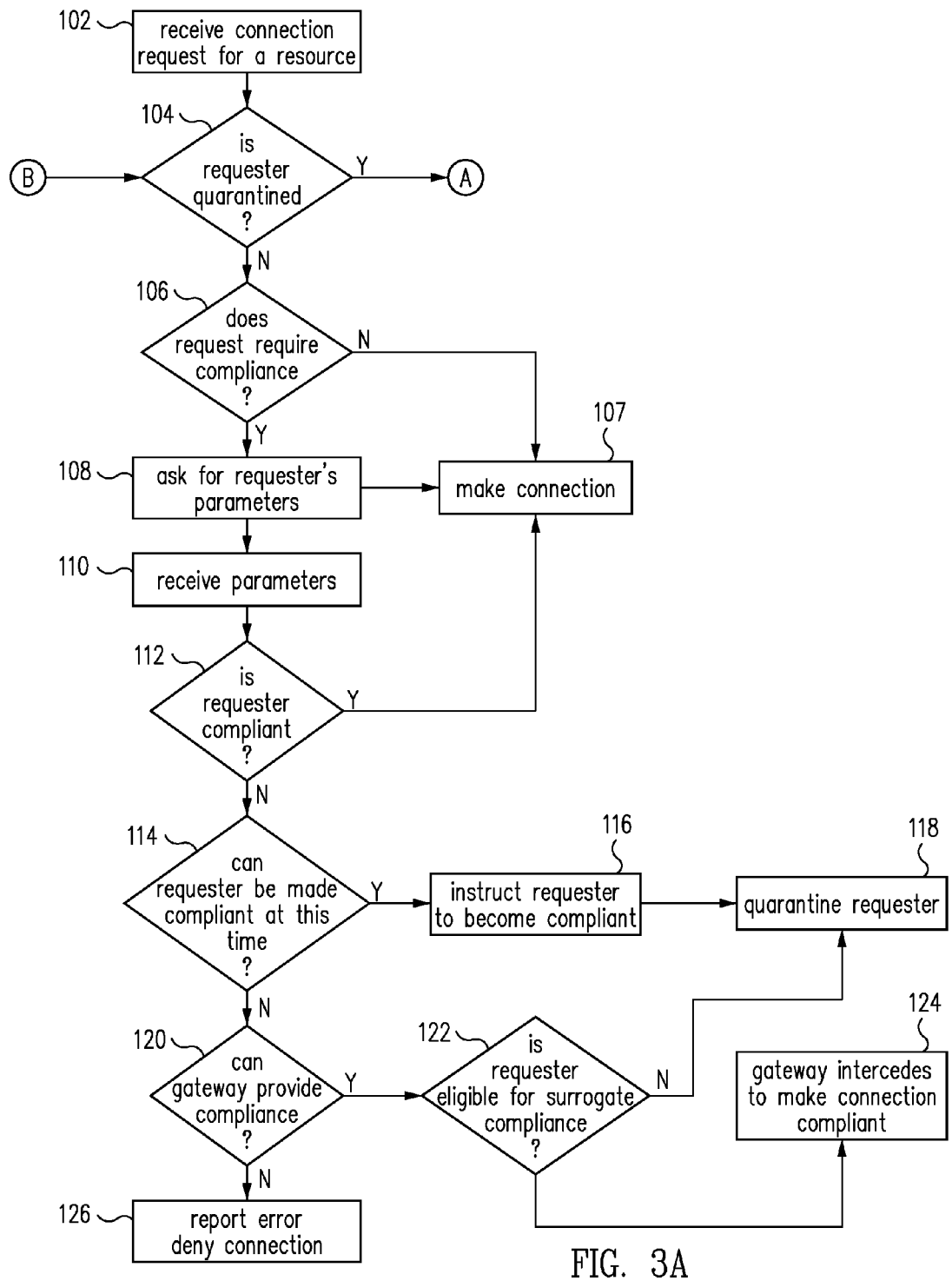
FIGS. 3, 3A and 3B represent a flowchart of a method of controlling access and maintaining compliance in accordance with one embodiment of the present invention.
Figure 3:
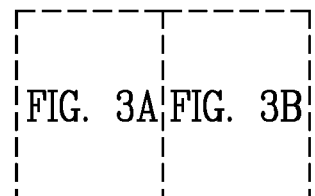
Figure 3B:
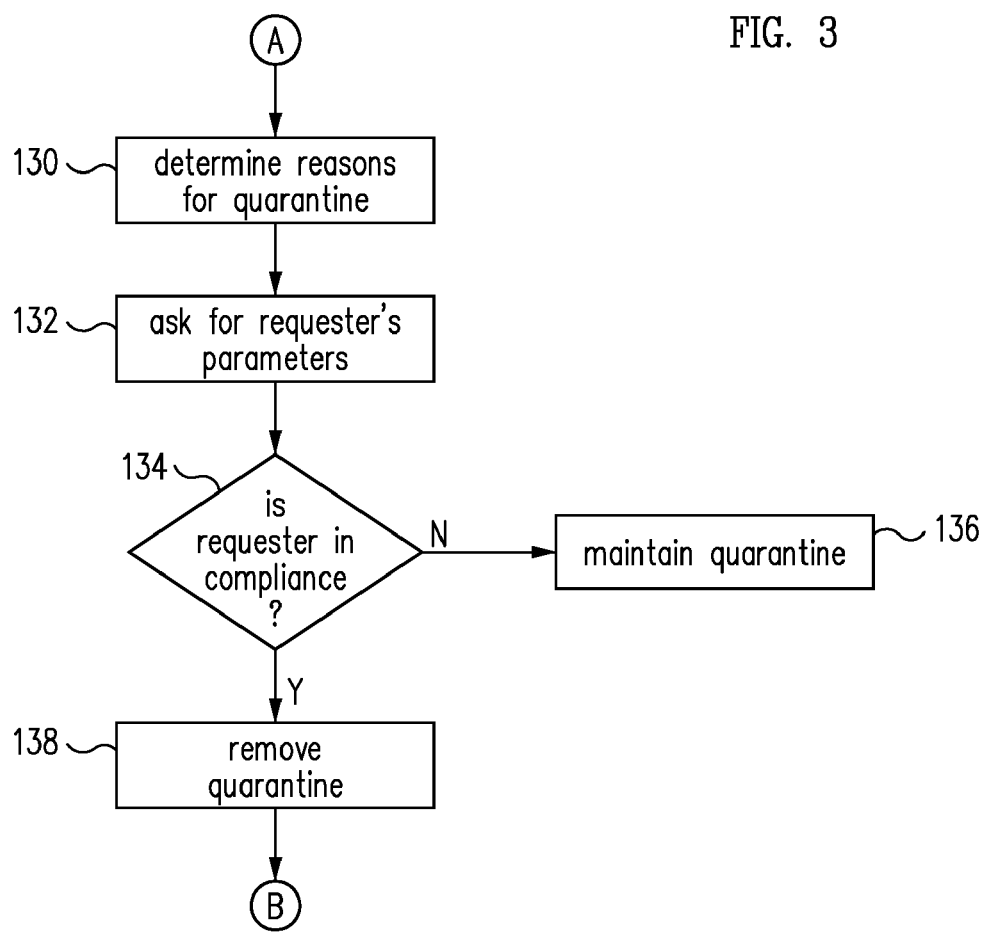

In one method according to an embodiment of the present invention, as described below with respect to the flow chart shown in FIGS. 3, 3A and 3B, the security gateway 12 will receive a request for a resource or connection from a requesting client at step 102. Subsequently, step 104, the security gateway 12 determines if the requesting client has already been quarantined. If not already quarantined, control passes to step 106 where it is determined if the request requires compliance. If compliance is not required, then the connection is made at step 107. If, at step 106, compliance is required, control passes to step 108 where the security gateway 12 inquires of the requestor's compliance parameters on which a compliance determination can be based. The parameters are received, step 110, and a determination as to whether or not the requestor is in compliance is made at step 112. If the requestor is compliant, control passes to step 107 where the connection is completed.

If, as determined at step 112, the requestor is not in compliance, control passes to step 114 where it is determined whether or not the requestor can be made compliant at this time. This may involve a determination as to whether or not a server that is required by the client in order to obtain, for example, up to date anti-virus descriptions is available or if the requesting client is able to make itself compliant at this time. As has been discussed above, a client may not be able to make itself compliant if it requires rebooting the system, for example, and the client is subject to high-availability requirements.

If, as determined at step 114, the requestor can be made compliant, control passes to step 116 where the requestor is instructed to obtain compliance and subsequently, at step 118, the requestor is quarantined.

Returning to step 114, if the requestor cannot be made compliant, control passes to step 120 where it is determined whether or not the security gateway 12 can provide compliance. If compliance can be provided by the security gateway, in that the security gateway 12 has the capacity for providing compliance in the aspect that is necessary, control passes to step 122 where it is determined whether or not the requestor is eligible for "surrogate" compliance to be performed on the requestor's behalf by the security gateway 12. The determination of eligibility may involve determining whether or not the requestor has signed up to receive, i.e., has paid for, a level of service, i.e., a Quality of Security (QoSec) contract. If the requestor is not eligible for surrogate compliance, control passes to step 118 where the requestor is quarantined. Alternatively, if the requestor is eligible for surrogate compliance, control passes to step 124 where the security gateway 12 intercedes to make the requested connection compliant. Returning to step 120, if the security gateway 12 cannot provide compliance then control passes to step 126 where the connection is denied and/or an error is reported as to this transaction.

Returning to step 104, if it is determined that the requestor is quarantined, control passes to step 130 where the reasons for the quarantine are determined. This determination may involve another request of the requesting client to provide its current parameters in order to determine whether the client has now become non-compliant with respect to another aspect of its operation, step 132. In other words, the original reason for quarantine may have been remediated but in the intervening period of time, another parameter is now causing the client to be non-compliant. This new reason for non-compliance may be due to either a component on the client or a change in policy since the last request for access. At step 134, it is determined whether or not the requester is now in compliance and if not, control passes to step 136 where the requestor is maintained in a quarantined state. If, however, the requestor is now determined to be in compliance, control passes to step 138 where the requestor is removed from its quarantined state.

It is contemplated that the security gateway 12 provides a surrogate connection on behalf of a non-compliant client. Two exemplary, but non-limiting examples include: operating in a mode similar to a bridge and, in another mode, operating similarly to a router. The discussion above with respect to the functions in FIG. 2 may be considered the "bridge" mode of operation. As discussed with respect to FIG. 2, the connection between the client and server is made with the security gateway 12 performing a function on the data as it passes through. Alternately, in surrogate "router" mode, the client and the destination resource are not directly connected but the security gateway 12 operates as an intermediary between the two, while providing the necessary services to compensate for the lack of compliance of the client. It is intended that within the specification, a surrogate connection, unless explicitly defined as otherwise, encompasses either or both of bridge and router operation. One of ordinary skill in the art will understand that the security gateway 12 can operate at other levels of the OSI connection model in order to provide the surrogate compliance as described herein. For instance, the gateway 12 may be a switch device that operates at a lower level than a router or bridge and, yet, can still provide the functionality as described herein.

The first and second clients 14, 16 communicate with the security gateway 12 using a network channel. This network channel is used for both communication to the security gateway 12 in order to establish and provide a specific security level awareness by the security gateway 12 and to facilitate requests from the first and second clients 14, 16 to and from the network 10 and any other services network. The clients 14, 16 may use a Virtual Private Network (VPN) application to provide additional security for this communication. The VPN application can either be a "heavy weight" solution, such as an IPSec application or a "light-weight" solution, such as a Secure Sockets Layer (SSL) implementation. A VPN solution is said to be client-less when it does not require the installation of an application on the client. In this situation, a VPN driver may be downloaded from the security gateway 12 and installed, but the installation does not require loss of connectivity or a reboot by the client. The driver may remain or be removed when the client reboots.

When, for example, a client is identified as not being compliant, then its respective network data flow over the network channel is directed to a non-compliant data flow within the security gateway 12. This may occur when a client does not meet compliance, when adaptive or "surrogate" compliance has not been identified as being available for the data stream, and before and/or while the requested connection is being verified. When a client is placed on this non-compliant network data flow, only remediation is possible. Once a client meets compliance, it is brought back to the standard network data flow from which it can request network services and resources.

As described above, when a client is non-compliant, the response from the security gateway 12 will specifically identify the areas of non-compliance. In one non-limiting example, one aspect of the authorization system is to tag or mark a flow of control as requiring anti-virus scanning by the security gateway 12 instead of relying on the client. In this way, clients that may be out of conformance or compliance may request operations in which the security gateway 12 is just as capable of providing the desired level of security. For those clients using this particular method, the client may either provide the security required as measured by its level of compliance or allow the security gateway 12 to adaptively apply the desired level of security. Service plans may be constructed such that there is a charge to the user for implementing, on the security gateway 12, a function, such as anti-virus scanning, that can just as easily be performed on the client.

In general, a request from a client to connect with a destination server will result in a list of security attributes which must be supported for the data flow from the client to the server. When client compliance meets the necessary level of compliance, security scanning such as anti-virus (AV), is performed by the client. This provides performance benefits for both the client and security gateway. When a client, however, is non-compliant, the security gateway 12 will respond with the requirement for AV scanning. The result is a slight loss in throughput for the client, but the ability to obtain resources during remediation or when remediation is not possible due to other requirements on the client, such as high availability or the inability to obtain a resource required for remediation which requires access to an unprotected environment where client compliance is normally required.

In one embodiment of the present invention, each of the clients 14, 16 include components in the form of resident software programs that are used by the security gateway 12 to determine compliance. In addition, resident modules that may be in the form of software programs are also provided in the security gateway 12 as will be discussed below with respect to FIG. 4.

An end-point compliance subsystem 402 validates a client's compliance level and has three primary responsibilities: collecting integrity measurements, validating compliance, and remediation. As determined from the client's measurement reporting policy, the end-point compliance subsystem 402 collects measurements from a client. The gateway 12 then either validates these measurements or provides them to an appropriate remote compliance server for validation. Additional measurements may be requested by a component of the end-point compliance subsystem 402 if the information reported is not sufficient to determine a client's compliance. The end-point compliance subsystem 402 also remediates a client that is determined to be non-compliant. This may involve communicating remediation instructions back to a client. As a result, end-point compliance components on the client can then perform the remediation and provides a process to validate the new compliance levels.

In one embodiment, client compliance functionality is obtained via integration of Sygate infrastructure and components available from Symantec.

Other components of the end-point compliance subsystem 402 compare the measurements found on a client against a respective client compliance policy. The policy is used to determine compliance that may or may not depend on the user being authenticated. Results of compliance validation, along with results of user authentication are reported back to the client. If the authentication negotiation succeeds, then the client session is reported to a session manager along with its authentication and compliance levels.

Figure 4:
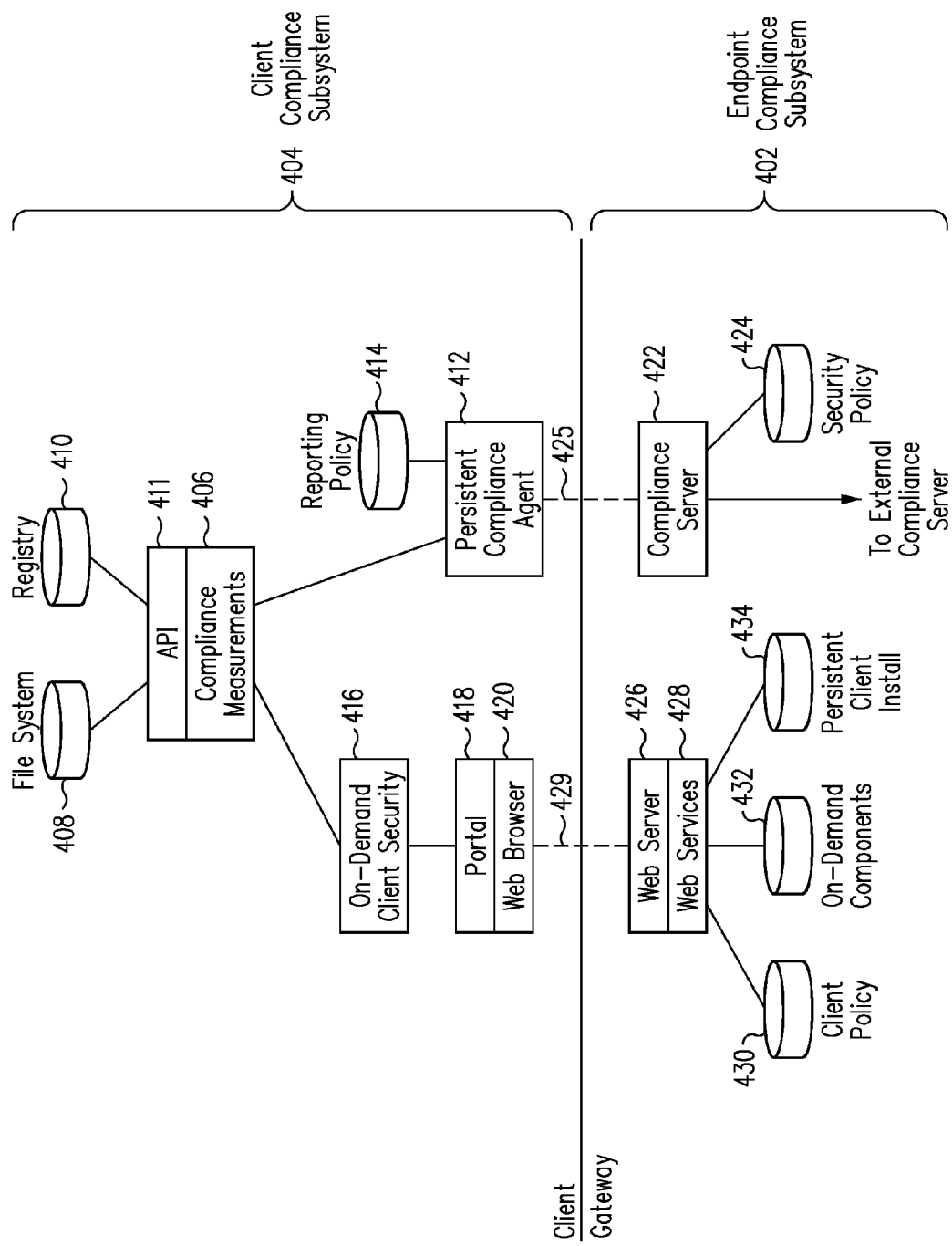
FIG. 4 is a block diagram of components of a system in accordance with one embodiment of the present invention.

As shown in FIG. 4, a client compliance subsystem 404 includes a compliance measurement agent 406 in which integrity measurements that reflect the respective client's compliance levels are stored on a client's file system 408 and Windows registry 410. An application programming interface (API) 411, for example the SymSentry API provides access to the measurements stored in the file system 408 and the Windows registry 410. An on-demand compliance agent 406 and a persistent compliance agent 412 each mines the data repositories, i.e., the file system 408 and the registry 410, via the API 411 in order to gather client integrity measurements for determining client compliance level.

In one embodiment of the present invention, a persistent compliance agent 412 is provided as part of the client compliance system 404. The persistent compliance agent 412 is in communication with a reporting policy 414 for determining what component levels are reported. The persistent compliance agent 412 is provided in a managed client, i.e., one that has specific client applications pre-installed or a client which has the privileges necessary to install the client applications when needed. These client applications include security software programs available from Symantec Corp., of Cupertino, Calif. The client applications that would be pre-installed or for which privileges are provided to install, include a client compliance agent which collects integrity measurements, validates compliance, and communicates results to a compliance server provided in the end-point compliance subsystem 402 and which will be discussed in more detail below.

In an alternate embodiment, i.e., one where the client is unmanaged in that it does not have client security applications pre-installed, an on-demand client security agent 416 is provided. The on-demand client security is provided via a portal 418 and a web browser 420 that combine to provide a web-based application to provide an end user access to on-demand components and policies as well as access to a persistent client installation package.

The end-point compliance subsystem 402 includes a compliance server 422 coupled to a database 424 that includes the security policies for those clients coupling to the security gateway 12. The compliance server 422 communicates with the persistent compliance agent 412 over the network connection 425 that, in one embodiment, is an SSL connection. The compliance server 422 receives the integrity measurements collected by the persistent compliance agent 412, validates compliance based on administrator-configured policies, as stored in the database 424, and reports the results to a client session manager.

A web server 426 in conjunction with a web services agent 428 provides on-demand client components 432, a persistent client installation 434 and a client policy 430 to a connecting client. The web server 426 connects to the web browser 420 via a SOAP/SSL connection 429.

The compliance server 422 is coupled to an external compliance server (not shown) that is installed on another machine separate from the security gateway 12 but accessible via the network 10. The external compliance server provides more extensive compliance checking functionality than may be installed on the security gateway 12. One example of such an external compliance server is the Sygate policy server available from Symantec.

The client policy 430 provides the client with up to date compliance policies via the web services agent 428. The on-demand component agent 432 provides the client with on-demand client components via the on-demand components web services API 428. The persistent client install API 434 provides the client with up to date client installation packages via the persistent client install web services API.

In one embodiment of the present invention, the end-point compliance subsystem 402 expects that specific security components are running on the client machine. These security components may have been either pre-installed or downloaded on demand. As can be seen, the present invention provides both an on-demand agent for unmanaged machines and a persistent agent 412 for managed machines installed with the predetermined security components. It may be the situation where different levels of functionality are provided by an on-demand agent as compared to the persistent compliance agent.

As described above, the security gateway 12 may restrict a client's network access request based on the compliance level of the requesting client. The end-point compliance subsystem 402 collects integrity measurements with respect to the client and communicates them to the security gateway 12. It is then determined whether the client's compliance level is appropriate by comparing the measurements against an administrator-configured policy as stored in the database 424. Based on the foregoing determination, the client may either be quarantined because of lack of compliance and/or the client's access to specific network resources may be limited. Further, the end-point compliance subsystem 402 may respond to a client's compliance validation with remediation instructions. These instructions may be indicated as required and, therefore, the client must follow them and reinitiate the compliance validation process in order to obtain network access. As a non-limiting example, a client machine running Symantec anti-virus software but which has outdated virus signatures may be required to run LiveUpdate in order to be brought into compliance. If, however, the instructions for remediation are only recommended, the client may choose, perhaps with user input, whether and when to remediate. An example of this occurrence may be where the client machine is running a supported platform but does not have a permanent VPN client application that is necessary to install the required software.

Figure 5:
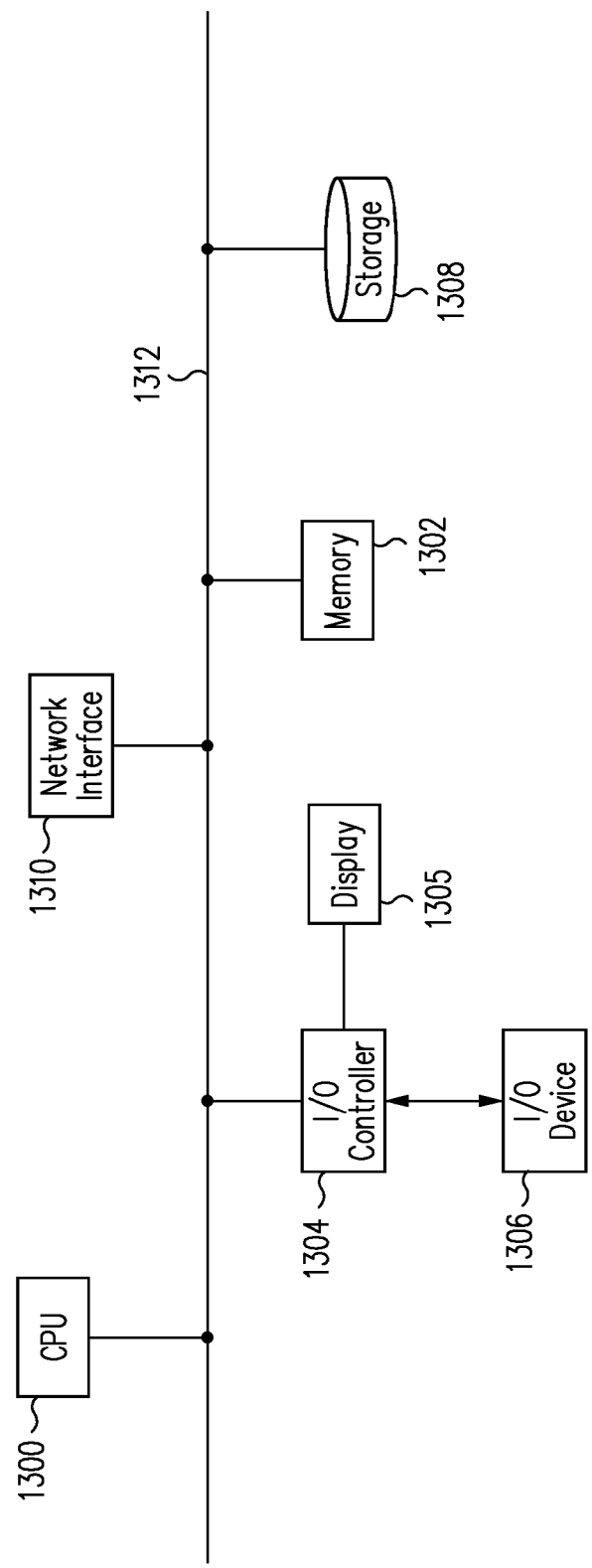
FIG. 5 is a block diagram of a device connected to a network in accordance with one embodiment of the present invention.

A client 14, 16, or server 18, 20, in addition to the security gateway 12, can be any one of a number of different devices, however, these devices have some components and/or functionality in common irrespective of their relative technical complexities. As shown in FIG. 5, these devices include a central processing unit 1300; a memory 1302; an input/output device or controller 1304 to couple to an IO device 1306, e.g., a keyboard, keypad or touch screen; a mass storage device 1308, e.g., a hard disk drive; and a network interface 1310 for communicating to a network. A bus 1312 couples these devices to one another to allow communication between them. The IO controller 1304 may also be coupled to a display device 1305.

Embodiments of the above-described invention may be implemented in either all software, all hardware, or a combination of hardware and software, including program code stored in a firmware format to support dedicated hardware. A software implementation of the above described embodiment(s) may comprise a series of computer instructions either fixed on a non-transitory tangible medium, such as a computer readable media, e.g. diskette, CD-ROM, ROM, or fixed disk. The series of computer instructions contained in a non-transitory tangible medium embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any non-transitory memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on system ROM or fixed disk.

Although various exemplary embodiments of the present invention have been disclosed, it will be apparent to those skilled in the art that changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

What is claimed is:

1. A method of controlling access in a network, the method comprising:
   receiving, from a connection to a client by a device connected between said client and said network, a request for access to a resource on the network;
   determining, by said device, a level of compliance for at least one software program on the client;
   comparing, by said device, the client compliance level to a predetermined policy to determine if the client is allowed access to the resource, wherein the policy is rules-based and at least one of the rules define a first time period during which a surrogate connection will not be established on behalf of the client;
   determining, from the policy by the device, if a surrogate connection to the resource is authorized to be established on behalf of the client after said comparing determining that the client compliance level does not allow access to the resource;
   establishing, in the device, the surrogate connection from said connection to the client to the resource on behalf of the client if said surrogate connection to the resource is authorized by the policy,
      wherein said device, in the establishing, uses a bridge mode of operation to connect the client to the resource for inline processing of information as the information flows through a direct channel between the resource and the client, and
      said device provides surrogate connection compliance for the client by the inline processing of the information as the information flows through the direct channel between the resource and the client; and
   quarantining, by the device, the client if said surrogate connection to the resource is not authorized by the policy.

2. The method of claim 1, wherein comparing the client compliance level to a predetermined policy comprises:
   comparing the client compliance level to a predetermined compliance threshold level,
      wherein access is denied if the client compliance level is less than the predetermined compliance threshold level.

3. The method of claim 1, further comprising:
   sending, to the client, a response comprising remediation information with respect to updating the compliance level when the client requests access to the resource during the first time period.

4. The method of claim 1, wherein the remediation information comprises at least one of:
   a URL pointing to a virus definition update; and
   a URL pointing to an operating system patch location.

5. The method of claim 1, wherein the level of compliance of the client comprises data regarding at least one of:
   an anti-virus software definition version;
   an operating system type;
   an operating system patch level; and
   a security software type.

6. The method of claim 1, wherein the policy is rules-based and at least one of the rules determines access as a function of client information, resource information and a date and time stamp of the access request.

7. The method of claim 1, wherein determining whether there is authorization to establish a surrogate channel on behalf of the requesting client is a function of one or more of:
   an identity of the requesting client;
   an identity of the network resource;
   a date and time of receipt of the request; and
   the client compliance level.

8. A computer program product for controlling access in a network, the computer program product comprising a non-transitory tangible computer usable medium having computer readable program code thereon, including:
   program code for receiving, from a connection to a client by a device connected between said client and said network, a request for access to a resource on the network;
   program code for determining, by said device, a level of compliance for at least one software program on the client;
   program code for comparing, by said device, the client compliance level to a predetermined policy to determine if the client is allowed access to the resource, wherein the policy is rules-based and at least one of the rules define a first time period during which a surrogate connection will not be established on behalf of the client;
   program code for determining, from the policy by said device, if a surrogate connection to the resource is authorized to be established on behalf of the client;
   program code for establishing, in said device if authorized by the policy, the surrogate connection from said connection to the client to the resource on behalf of the client, wherein said device, in the establishing, uses a bridge mode of operation to connect the client to the resource for inline processing of information as the information flows through a direct channel between the resource and the client, and said device provides surrogate connection compliance for the client by the inline processing of the information as the information flows through the direct channel between the resource and the client; and
   program code for quarantining, by the device, the client if said surrogate connection to the resource is not authorized by the policy.

9. The computer program product of claim 8, wherein the program code for comparing the client compliance level to a predetermined policy comprises:
   program code for comparing the client compliance level to a predetermined compliance threshold level,
      wherein access is denied if the client compliance level is less than the predetermined compliance threshold level.

10. A system for controlling access in a network, the system comprising:
   means for receiving, from a connection to a client by a device connected between said client and said network, a request for access to a resource on the network;
   means for determining, by said device, a level of compliance of the client;
   means for comparing, by said device, the client compliance level to a predetermined policy to determine if the client is allowed access to the resource, wherein the policy is rules-based and at least one of the rules define a first time period during which a surrogate connection will not be established on behalf of the client;
   means for determining, by said device, from the policy if a surrogate connection to the resource is authorized to be established on behalf of the client, after determining that the client compliance level does not allow access to the resource;
   means for establishing, in said device, the surrogate connection from said connection to the client to the resource on behalf of the client if authorized by the policy, wherein said device, in the establishing, uses a bridge mode of operation to connect the client to the resource for inline processing of information as the information flows through a direct channel between the resource and the client, and said device provides surrogate connection compliance for the client by the inline processing of the information as the information flows through the direct channel between the resource and the client; and
   means for quarantining, by the device, the client if said surrogate connection to the resource is not authorized by the policy.

11. The system of claim 10, wherein means for comparing the client compliance level to a predetermined policy comprises:
   means for comparing the client compliance level to a predetermined compliance threshold level,
      wherein access is denied if the client compliance level is less than the predetermined compliance threshold level.

* * * * *